United States Patent
Haas et al.

(10) Patent No.: US 11,162,390 B2
(45) Date of Patent: Nov. 2, 2021

(54) POWER PLANT WITH GAS TURBINE INTAKE AIR SYSTEM

(71) Applicant: Siemens Aktiengesellschaft, Munich (DE)

(72) Inventors: Sebastian Haas, Forchheim (DE); Johannes Lomani, Uttenreuth (DE); Kevin Moritz, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 71 days.

(21) Appl. No.: 16/310,558

(22) PCT Filed: Nov. 7, 2017

(86) PCT No.: PCT/EP2017/078407
§ 371 (c)(1),
(2) Date: Dec. 17, 2018

(87) PCT Pub. No.: WO2018/114113
PCT Pub. Date: Jun. 28, 2018

(65) Prior Publication Data
US 2020/0318497 A1    Oct. 8, 2020

(30) Foreign Application Priority Data
Dec. 22, 2016    (DE) .................... 10 2016 225 983.0

(51) Int. Cl.
*F01K 23/10*    (2006.01)
*F02C 6/18*    (2006.01)
(Continued)

(52) U.S. Cl.
CPC ............ *F01K 23/10* (2013.01); *F02C 6/18* (2013.01); *F01D 17/145* (2013.01); *F01K 13/02* (2013.01);
(Continued)

(58) Field of Classification Search
None
See application file for complete search history.

(56) References Cited

U.S. PATENT DOCUMENTS

| | | |
|---|---|---|
| 5,251,432 A | 10/1993 | Brueckner et al. |
| 5,345,755 A | 9/1994 | Brueckner et al. |

(Continued)

FOREIGN PATENT DOCUMENTS

| | | |
|---|---|---|
| CN | 102741536 A | 10/2012 |
| CN | 103109046 A | 5/2013 |

(Continued)

OTHER PUBLICATIONS

International search report and written opinion dated Apr. 5, 2018, for corresponding PCT/EP2017/078407.

*Primary Examiner* — Todd E Manahan
*Assistant Examiner* — Alyson Joan Harrington

(57) ABSTRACT

A power plant including a gas turbine, a waste heat steam generator and an intermediate circuit having a first heat exchanger, which is connected to an air inlet of the gas turbine, and a second heat exchanger, which is connected to a condensate circuit, having a condensate preheater in the waste heat steam generator. A first and a second high load valve, and parallel with these a first and a second low load valve for lower volume flows than through the first and second high load valve, are arranged on either side of the second heat exchanger. An associated method for optimizing efficiency and extending the operating range of a power plant.

20 Claims, 2 Drawing Sheets

(51) Int. Cl.
*F01D 17/14* (2006.01)
*F01K 13/02* (2006.01)
*F01K 17/02* (2006.01)

(52) U.S. Cl.
CPC ........ *F01K 17/025* (2013.01); *F05D 2220/72* (2013.01); *F05D 2260/2322* (2013.01); *F05D 2270/303* (2013.01)

(56) References Cited

U.S. PATENT DOCUMENTS

| | | | |
|---|---|---|---|
| 5,369,950 | A | 12/1994 | Bruckner et al. |
| 6,041,588 | A | 3/2000 | Bruckner et al. |
| 6,052,996 | A * | 4/2000 | Clark ............... F01K 23/04 60/650 |
| 6,233,939 | B1 | 5/2001 | Ngo-Beelmann et al. |
| 6,244,035 | B1 | 6/2001 | Krill |
| 2011/0185729 | A1 | 8/2011 | Held et al. |
| 2012/0067057 | A1 | 3/2012 | Hofmann et al. |
| 2013/0186087 | A1 | 7/2013 | Gibble et al. |
| 2016/0003159 | A1 | 1/2016 | Hotta et al. |
| 2016/0115869 | A1 | 4/2016 | Migl et al. |
| 2016/0305280 | A1 | 10/2016 | Grau Sorarrain et al. |

FOREIGN PATENT DOCUMENTS

| | | |
|---|---|---|
| CN | 105026731 A | 11/2015 |
| CN | 105705736 A | 6/2016 |
| DE | 1576872 A1 | 7/1970 |
| DE | 1576872 B2 | 12/1970 |
| DE | 19745272 A1 | 4/1999 |
| DE | 102012021357 A1 | 5/2014 |
| DE | 102013219166 A1 | 3/2015 |
| EP | 0523467 A1 | 1/1993 |
| EP | 1884640 A1 | 2/2008 |
| EP | 2589760 A1 | 5/2013 |
| EP | 2808501 A1 | 12/2014 |
| JP | H06221113 A | 8/1994 |
| JP | H11503211 A | 3/1999 |
| JP | 2001012211 A | 1/2001 |
| JP | 2001520342 A | 10/2001 |
| KR | 20120026569 A | 3/2012 |
| KR | 20140087708 A | 7/2014 |

* cited by examiner

POWER PLANT WITH GAS TURBINE INTAKE AIR SYSTEM

CROSS REFERENCE TO RELATED APPLICATIONS

This application is the US National Stage of International Application No. PCT/EP2017/078407 filed Nov. 7, 2017, and claims the benefit thereof. The International Application claims the benefit of German Application No. DE 102016225983.0 filed Dec. 22, 2016. All of the applications are incorporated by reference herein in their entirety.

FIELD OF INVENTION

The invention relates to a power plant and also to a method for energy optimization and operating range extension.

BACKGROUND OF INVENTION

Gas and steam turbine plants, also referred to as combined cycle power plants, in addition to the base load state which is relevant to continuous operation, are also intended to meet further load requirements just on account of the starting and stopping of the machines but especially also for changing load requirements in the electricity mains. In principle, the delivered power of the participating gas turbine can be influenced via the intake mass flow and the turbine inlet temperature. For reducing the intake mass flow, compressor inlet guide vanes (IGVs) with variable incidence angle are correspondingly adjusted in gas turbines at partial loads so that the inflow to the first rotor blade row is at least limited. However, the efficiency is also noticeably reduced in the process. Using previously customary systems for intake-air preheating, the efficiency is only slightly increased again. A further increase of the efficiency at partial loads significantly reduces fuel costs during partial load operation. Intake air preheating is also used in order to prevent icing, to reduce CO emissions at low partial load or, at maximum power and low outside air temperatures, which can lead to throttled compressor inlet guide vanes, in order to improve the efficiency.

For intake air preheating, higher value heat in the form of steam from the low-pressure stage of the heat recovery steam generator or auxiliary boiler was previously used in most cases, the steam was condensed in a heat exchanger, and consequently an intermediate circuit, typically with a water/glycol mixture, was heated, as a result of which the cold intake air of the gas turbine was preheated via a further heat exchanger. At partial loads, this preheating ensures that the gas turbine can be run with less throttling, or no throttling at all, and in this way a higher degree of efficiency is achieved, which results in reduced fuel consumption. The switching is simpler in this case and efficiency optimization is limited. The limiting effect here is that as the heat source low-pressure steam is to be used both in the steam turbine and in the system of the intake air preheating.

In order to provide more heat for the production of low-pressure steam, the high-pressure preheater bypass, with engaging of the intake air preheating at a fixed position, e.g. 60%, could be operated. Typically, the intake air preheating for the purpose of improving the partial load efficiency was enabled only when the unit power setpoint value had fallen short of a certain value, e.g. 70%.

The heat exchanger surface could be matched to the filling level in the condensing heat exchanger. By means of this filling level, the valve position of the water/glycol-side three-way valve, by means of which the water/glycol mixing temperature before entry into the air/water heat exchanger is controlled, is adjusted so that a correctly sized valve opening (e.g. 60%) is constantly achieved again.

Also, with large shell-and-tube heat exchangers hot district heat water or hot condensate from the condensate preheater can be used for preventing ice formation in the gas turbine intake air and for improving the carbon monoxide emission. These systems, however, have little flexibility and on account of the overall size of the heat exchangers utilization of the heat source and the basic switching and controlling are limited to a comparatively small power output and are able to control very small power outputs with only poor effect.

In general, such plants have a very limited range of application with regard to the transmitted heat output and a very narrow operating range with regard to the controllability at partial loads. Furthermore, the switching of the heat utilization cannot be transferred in a simple manner to other power plant configurations.

SUMMARY OF INVENTION

It is an object of the invention to provide a power plant with improved efficiency and a wider operating range compared with the prior art. It is a further object of the invention to specify a corresponding method for efficiency optimization and operating range extension.

The invention achieves the object which is directed toward a power plant, by it providing that in the case of such a power plant comprising a gas turbine, a heat recovery steam generator and an intermediate circuit with a first heat exchanger, which is connected into an air inlet of the gas turbine, and a second heat exchanger, which is connected into a condensate circuit which comprises a condensate preheater in the heat recovery steam generator, a first or second high-load valve and, parallel thereto, a first or second low-load valve for smaller throughflows than through the first or second high-load valve are arranged on both sides of the second heat exchanger.

By the use of switching with high-load and low-load control valves on both sides of the second heat exchanger, i.e. one pair consisting of a high-load valve and a low-load valve on the primary side and a further pair on the secondary side, this, despite the possibility of comparatively large throughflows (through the high-load valves), can be reliably operated without the risk of evaporation and freezing even with comparatively small heat outputs. The embodiment with two pairs of valves naturally represents only a minimum. If necessary, more valves can also be used. It is important that only by the selection of valves for different throughflow volumes does an accurate adjustability of the throughflow volumes on both sides of the second heat exchanger (that is to say primary side and secondary side) over a wide range become possible in the first place.

In one advantageous embodiment, the condensate circuit comprises a first recirculation line which connects an outlet of the condensate preheater to an inlet of the condensate preheater, wherein redundant recirculation pumps (i.e. two or more) are arranged in the first recirculation line and wherein a first branch line branches from the first recirculation line and opens into the second heat exchanger and a second branch line connects the second heat exchanger to the inlet of the condensate preheater. By using a recirculation of the condensate outlet the second heat exchanger can be operated more reliably in the case of comparatively low heat outputs and the risk of condensing and freezing is further reduced. The heat transfer is influenced not only via the inlet temperature but also via the throughflow and can therefore be adjusted better.

In a further advantageous embodiment, the first branch line branches from the first recirculation line downstream of the recirculation pumps in the flow direction. As a result, the recirculation pumps can transport the condensate directly back to the inlet of the condensate preheater not only through the recirculation lines but also to the second heat exchanger so that additional pumps are not required for this.

The first high-load valve is expediently arranged in the first branch line and the first low-load valve is expediently arranged in a first bypass line around the first high-load valve.

In an alternative embodiment, the first high-load valve is arranged in the second branch line and the first low-load valve is arranged in a first bypass line around the first high-load valve.

In addition to the recirculation of condensate which is heated in the condensate preheater it is also advantageous for the fine adjustment of the preheating if condensate which is cooled in the second heat exchanger is also recirculated, in fact without heating, or at least only with limited heating, in the condensate preheater. For this purpose, four alternatives are proposed.

In the first case, a second recirculation line can branch from the second branch line and opens into the first recirculation line upstream of the redundant recirculation pumps in the flow direction of a condensate.

In the second case, if the main-load and low-load valves of the first bypass line are arranged together in the second branch line, a second recirculation line can branch from the first bypass line and in this second case also opens into the first recirculation line upstream of the redundant recirculation pumps in the flow direction of a condensate.

In the third case, a third recirculation line branches from the second branch line and opens into the first branch line. In this case, however, a pump has to be connected into the third recirculation line.

In the fourth case, the condensate preheater has at least two heating surfaces, of which at least one has a bypass, i.e. the bypass especially bypasses the last of the heating surfaces, as seen in the flow direction of a condensate, and opens into the first recirculation line, for example upstream of the recirculation pumps.

In one advantageous embodiment of the invention, the second high-load valve is arranged in the intermediate circuit and the second low-load valve is arranged in a second bypass line around the second high-load valve, wherein a third bypass line around the second heat exchanger, followed by a static mixer, is also arranged in the intermediate circuit, wherein the second high-load valve fulfills the function of a three-way valve and an outlet of the second high-load valve is connected to an inlet of the second heat exchanger and the third bypass line branches from a further outlet of the second high-load valve. The second high-load valve can in this case actually be a three-way valve, but the function of a three-way valve can also be fulfilled by two separate control valves, i.e. a control valve in the hot fluid branch (that is to say through the second heat exchanger) and in the cold fluid branch (around the second heat exchanger) respectively, which valves are operated in opposite directions.

As a consequence of the parallel connection of the second high-load valve and second low-load valve the quantity of fluid flowing through the second heat exchanger can now also be accurately adjusted on the secondary side of the second heat exchanger as can already be accurately adjusted on its primary side. By means of the third bypass line, it is ensured that the fluid quantity circulating in the intermediate circuit is not influenced by this but the residual quantity can be directed past the second heat exchanger in a simple manner. The sometimes large differences of temperature and viscosity of the fluid in the intermediate circuit as a result of dividing the fluid flows are intermixed by means of the static mixer, forming a homogenous level.

It is expedient if the power plant comprises a device for controlling the first and second high-load valves and first and second low-load valves.

Finally, it is advantageous with regard to space requirement if the second heat exchanger is at least one fully-welded plate heat exchanger. In this case, the second heat exchanger can indeed consist of two separate fully-welded plate heat exchangers, especially when one of the two is provided with a bypass so that the transferred heat quantity to the condensate, and therefore also the preheating of the intake air, can be adjusted more finely.

The object which is directed toward a method for efficiency optimization and operating range extension of a power plant is achieved by means of a method in which a fluid is conducted in an intermediate circuit and in the process heat is transferred via a first heat exchanger to air which is inducted by the gas turbine, wherein heat of a preheated condensate from the heat recovery steam generator is transferred via a second heat exchanger to the fluid, wherein depending on heat demand the condensate is directed via a first high-load valve or via a first low-load valve which is connected in parallel to the first high-load valve and designed for smaller throughflows than the first high-load valve. As a result of this, the temperature of the condensate, which flows through the second heat exchanger can be easily adjusted even in the case of small mass flows.

With regard to the adjustability of the required condensate temperature for the second heat exchanger which is as accurate as possible, it is advantageous if at least some of the condensate, after yielding heat to the fluid, bypassing a preheating, is admixed with a flow of preheated condensate and if the mixture is fed to the second heat exchanger.

At least similar requirements for adjustability with regard to temperature and throughflow naturally also applies to the fluid which circulates in the intermediate circuit, which is why it is also advantageous in this case if the fluid, depending on heat demand, is directed via a second high-load valve or via a second low-load valve which is connected in parallel to the second high-load valve and designed for smaller throughflows than the second high-load valve.

It is expedient if a heating margin of the intermediate circuit, i.e. the temperature difference of the fluid between inlet and outlet at the second heat exchanger, is used as a control variable for a condensate mass flow through the second heat exchanger. The condensate mass flow which flows through the condensate-heated second heat exchanger is therefore correspondingly adjusted to the heat demand of the intermediate circuit. As a result of this, it is ensured that the mass flows of the medium which is to be heated and the medium which performs the heating are constantly in a favorable ratio to each other, which has a positive effect on the operation of the second heat exchanger. This principle of operation lowers the risk of freezing of the condensate and also of vaporizing of the fluid which is typically a water/glycol mixture. Also, as a result of this the water/glycol mixing temperature control is improved since an adjustment of the actuating element (three-way valve) now brings about a constant temperature change by a specified amount, i.e. the increase is now constant.

A position of the second high-load valve can alternatively be used as a control variable for a condensate mass flow through the second heat exchanger.

It is also expedient if a temperature setpoint value for the intake air is continuously adjusted in dependence of a gas turbine proportion of an established power setpoint value of the power plant. Since by means of the invention the temperature of the intake air can now be finely adjusted, it would make sense to adjust the intake air continuously to an optimum which is calculated based on the current operating state of the power plant.

In case the heat quantity which is available at the "cold end" of the heat recovery steam generator is insufficient for an optimum operation of the intake air preheating, the following advantageous possibilities exist in order to increase the heat capacity available for the intake air preheating and therefore to extend the operating range:

On the one hand, a low-pressure stage can be banked up in the heat recovery steam generator, i.e. the pressure in the low-pressure drum is raised in order to shift heat in the heat recovery steam generator to the condensate preheater.

On the other hand, when required, possibly also in addition to the pressure banking in the low-pressure section, a high-pressure preheater bypass in the heat recovery steam generator can be opened in stages in order to shift heat to the condensate preheater.

As a result of the graduated measures for heat provision at the condensate preheater, i.e. staged low-pressure drum pressure increase, staged opening of the high-pressure preheater bypass, an efficiency-optimized operation is achieved. Just enough heat is shifted to the condensate preheater so that the theoretically still usable residual heat of exhaust gas escaping into the atmosphere is reduced to a minimum.

With regard to the extension of the operating range of the power plant, the aforesaid measures for intake air preheating can be combined with the partial shutting down of burners of the gas turbine so that it is possible to operate the power plant with good efficiency and a comparatively very low power output, wherein the exhaust gas emissions remain within the permissible range.

Since the exhaust gas of the gas turbine can be cooled to the minimum permissible limit value with the aid of the condensate preheater as the heat source for intake air preheating, the efficiency of the concept according to the invention is considerably better than in the case of the known solution from the prior art using steam as the heat source.

In the case of new-type gas turbines, it is also necessary to realize small intake-air preheat outputs in the event of very cold outside temperatures, as a result of which a risk of freezing can result on the condensate side, which is achieved by means of the new invention.

By means of the invention, the operating range for the partial-load efficiency improvement is increased. Instead of predetermining a constant temperature setpoint value for the intake air when falling short of a firmly established limit of the power setpoint value, the intake-air temperature setpoint value is adjusted in dependence of the established power setpoint value so that even at higher partial loads an efficiency improvement is achieved, and the IGVs of the gas turbine do not open excessively wide or the established power setpoint value can be adjusted.

The advantage of the invention also lies in a further increased saving of fossil fuels (gas, oil) at partial loads of a gas and steam power plant and in lower operating costs and emissions associated therewith and also in the realization of a large, flexible range of application.

The continuous controlling and the use of fully-welded plate heat exchangers (with small space requirement) contribute to these advantages.

In comparison to the current standard solution using steam as the heat source, a part of the heat energy of the exhaust gas from the last heat exchanger surface of the heat recovery steam generator, which up to now could not be utilized, can now be utilized in partial load operation of the gas-turbine combined cycle power plant for increasing efficiency and for preventing icing during winter operation. With simultaneous preheating of the gas-turbine intake air using hot condensate as the heat source, the higher-value steam from the low-pressure drum can continue to be used in the steam turbine.

As a result of controlling the heating margin across the condensate-heated heat exchanger, an operation which gives consideration to the heat exchanger and the adjoining pipe lines is achieved and the risk of freezing of the heat exchanger is significantly reduced. Aid is given to a speedy and problem-free starting and shutting down and the operation with very low heat input can also be ensured with constant control quality, which in total has a positive effect on the availability of the entire system.

The commercial impacts are an improved competitive situation as a result of these possibilities, both for new plants and for retrofitting for existing gas-turbine combined cycle power plants which frequently run at partial loads and therefore the saving of fuel costs can be well utilized.

If a fast ramping of the unit power setpoint value is required, the intake-air temperature setpoint value can be predetermined based on the current power setpoint value so that during high ramping to full load the maximum permissible temperature for achieving this power is not exceeded. Instead of hot condensate from the condensate preheater the abovementioned concept can alternatively also resort to the use of district heat or another hot-water heat source or can also be implemented in combination of both heat sources.

BRIEF DESCRIPTION OF THE DRAWINGS

The invention is explained in more detail by way of example with reference to drawings. In the drawings, schematically and not to scale.

DETAILED DESCRIPTION OF INVENTION

Figure 1:
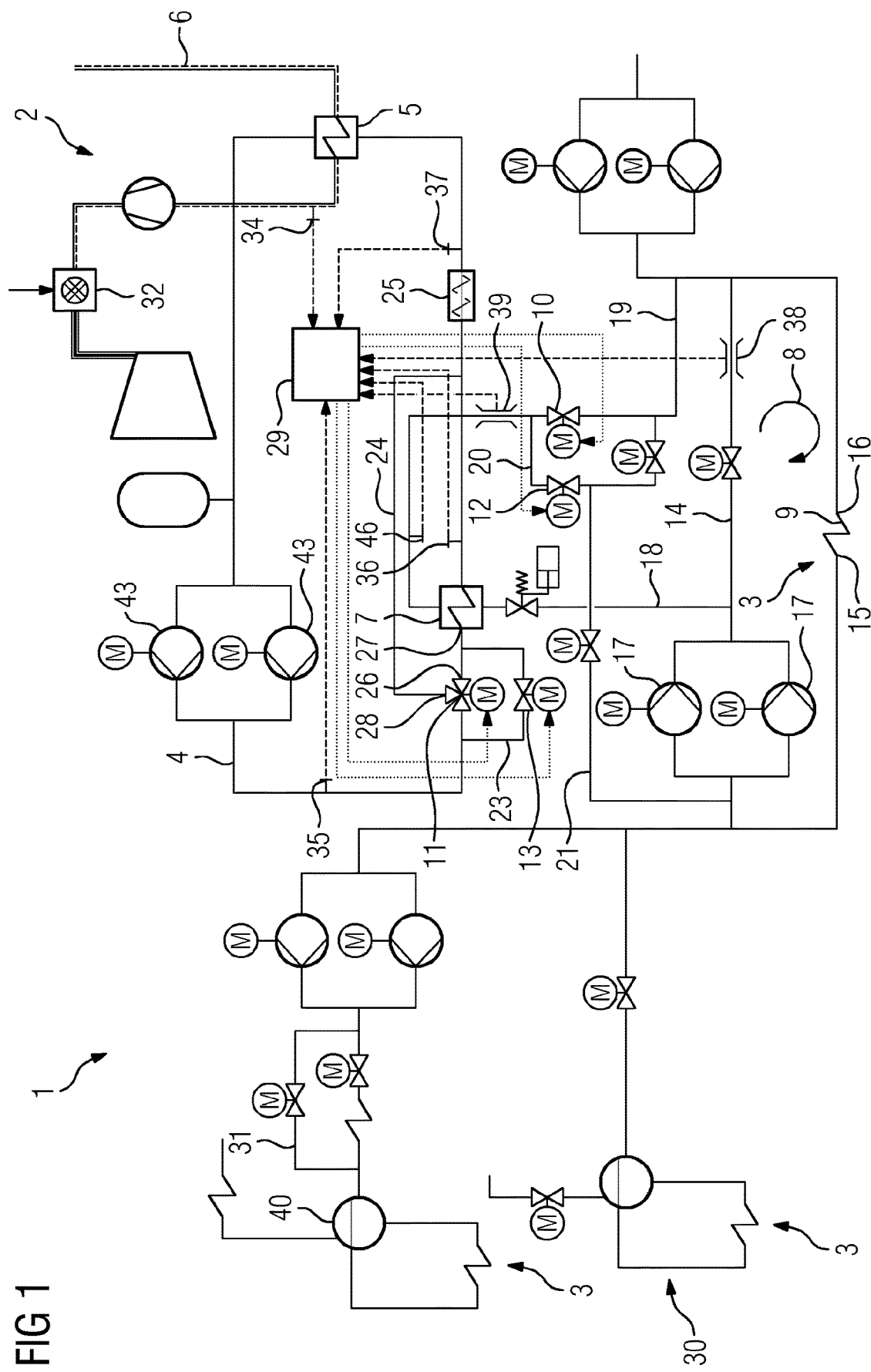
FIG. 1 shows a power plant according to the invention.

FIG. 1 shows schematically and by way of example a power plant 1 with a gas turbine 2, and also, in a greatly simplified manner, components of a heat recovery steam generator 3 which are relevant to the invention. The preheating of the intake air of the gas turbine 2 is carried out via an intermediate circuit 4 for a fluid, which is suitable as a heat transfer medium, for example a water/glycol mixture, with a first heat exchanger 5, which is connected into an air inlet 6 of the gas turbine 2, and with a second heat exchanger 7, which is designed as a fully-welded plate heat exchanger and is connected into a condensate circuit 8. Another type of heat exchanger is of course also possible, for example a shell-and-tube heat exchanger. The fully-welded plate heat exchanger, however, offers advantages on account of its compactness. According to the invention, on both sides of the second heat exchanger 7, i.e. both on the primary side and on the secondary side, are arranged a first high-load valve 10 and a second high-load valve 11 and, parallel thereto, a first low-load valve 12 and a second low-load valve 13 for smaller throughflows than through the first high-load valve 10 and second high-load valve 11.

The condensate circuit 8 comprises a condensate preheater 9 in the heat recovery steam generator 3, and also a first recirculation line 14 which connects an outlet 15 of the condensate preheater 9 to an inlet 16 of the condensate preheater 9, wherein redundant circulating pumps 17 are arranged in the first recirculation line 14. The second heat exchanger 7 is incorporated into the condensate circuit 8 by a first branch line 18 branching from the first recirculation line 14 downstream of the recirculation pumps 17 in the flow direction and opening into the second heat exchanger 7, and by a second branch line 19 connecting the second heat exchanger 7 to the inlet 16 of the condensate preheater 9.

The first high-load valve 10 and the first low-load valve 12, which is arranged in a first bypass line 20 around the first high-load valve 10, can be arranged either together in the first branch line 18 (FIG. 2) or in the second branch line 19 (FIG. 1).

For recirculation of a condensate which is cooled in the second heat exchanger 7 without further heating in the condensate preheater 9 there are different possibilities. According to the embodiment according to FIG. 1, a second recirculation line 21 branches from the first bypass line 20 and opens into the first recirculation line 14 upstream of the redundant recirculation pumps 17 in the flow direction of a condensate. According to an alternative embodiment, not shown, the second recirculation line 21 branches directly from the second branch line 19 and also opens into the first recirculation line 14 upstream of the redundant recirculation pumps 17 in the flow direction of a condensate. The difference from the first embodiment is therefore only in the branching from the first bypass line 20 or the second recirculation line 21 as a consequence of arranging the first high-load valve 10 and the first low-load valve 12 "downstream" or "upstream" of the second heat exchanger 7.

Figure 2:
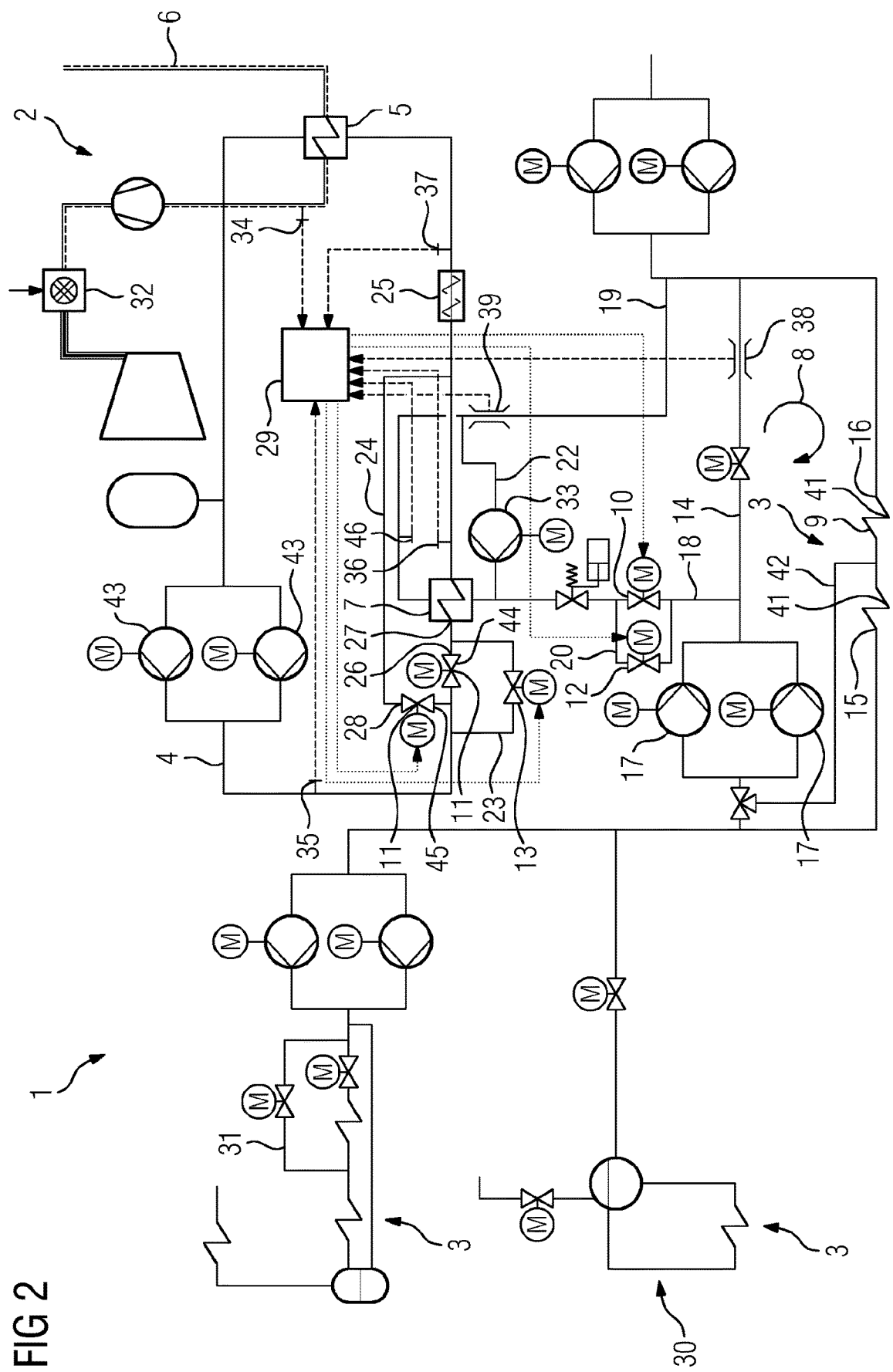
FIG. 2 shows a power plant according to the invention with different alternatives.

Finally, FIG. 2 shows an embodiment in which the cooled condensate is not fed back upstream of the redundant recirculation pumps 17 but in which a third recirculation line 22 from the second branch line 19 opens directly into the first branch line 18. In this case, however, a pump 33 is required in the third recirculation line 22.

In addition to the first heat exchanger 5 and the second heat exchanger 7, the second high-load valve 11 is arranged in the intermediate circuit 4 and the second low-load valve 13 is arranged in a second bypass line 23 around the second high-load valve 11. Also, a third bypass line 24 around the second heat exchanger 7, followed by a static mixer 25, is arranged in the intermediate circuit 4. The second high-load valve 11 is designed as a three-way valve in FIG. 1 and an outlet 26 of the second high-load valve 11 is connected to an inlet 27 of the second heat exchanger 7 and the third bypass line 24 branches from a further outlet 28 of the second high-load valve 11. FIG. 2 shows an alternative embodiment with two separate control valves 44, 45, i.e. one control valve 44 in the hot fluid branch (that is to say through the second heat exchanger 7) and one control valve 45 in the cold fluid branch (around the second heat exchanger), which are operated in opposite directions.

FIG. 1 also shows a device 29 for controlling the first and second high-load valves 10, 11 and first and second low-load valves 12, 13. The controlling is carried out in this case inter alia on the basis of temperatures or throughflows which are measured at different points. For this purpose, the power plant 1 comprises a temperature measuring point 34 for the preheated intake air and temperature measuring points 35, 36 and 37 for the fluid in the intermediate circuit. The temperature measuring point 35 in FIGS. 1 and 2 is arranged between the recirculation pumps 43 in the intermediate circuit 4 and a branch for the second bypass line 23, but it can also already be arranged in the intermediate circuit upstream of the recirculation pumps 43 and provides the temperature of the fluid upstream of the second heat exchanger 7. The temperature measuring point 36 is arranged directly downstream of the second heat exchanger 7 and provides the temperature of the fluid after heat exchange with the condensate. The difference of the measured values of the temperature measuring points 35 and 35 is referred to as the heating margin. Finally, by means of the temperature measuring point 37 the mixing temperature of the fluid is determined, i.e. the temperature which results by mixing the fluid flows through the second heat exchanger 7 or past it and at which the first heat exchanger 5 is acted upon for heating the gas-turbine intake air. Throughflow measuring points 38, 39 for the condensate are arranged in the second branch line 19 and in the first recirculation line 14 in the figures. Representation of the controlling is greatly simplified in the figures. The actual controlling is more complex and in addition to many other aspects naturally also includes controlling of the recirculation pumps 17 in the first recirculation line 14. The controlling does not have to be carried out centrally for all the components either, as shown in the figures.

If the heat quantity in the region of the condensate preheater 9 is no longer sufficient for the intake air preheating, then a low-pressure stage 30 can be banked up in the heat recovery steam generator 3 in order to shift heat in the heat recovery steam generator 3 to the condensate preheater 9.

If this measure should still not be sufficient, a high-pressure preheater bypass 31 can be opened in the heat recovery steam generator 3 in a further step in order to shift still more heat to the condensate preheater 9. This functions both for high-pressure regions with high-pressure drums 40, as shown in FIG. 1, and in the Benson Variant shown in FIG. 2.

Also shown in FIG. 2 is a variant of the condensate preheater 9 with split heating surfaces 41 of which one has a bypass 42 so that the heat quantity which is transferred to the condensate can be adjusted better.

The invention claimed is:

1. A power plant comprising:
   a gas turbine,
   a heat recovery steam generator,
   an intermediate circuit with a first heat exchanger, which is connected into an air inlet of the gas turbine, and a second heat exchanger, which is connected into a condensate circuit and comprises a condensate preheater in the heat recovery steam generator, and
   a first high-load valve and second high-load valve and, parallel thereto, a first low-load valve and second low-load valve, for smaller throughflows than the first high-load valve and second high-load valve, which are arranged on both sides of the second heat exchanger.

2. The power plant as claimed in claim 1,
   wherein the condensate circuit comprises a first recirculation line which connects an outlet of the condensate preheater to an inlet of the condensate preheater, wherein redundant recirculation pumps are arranged in the first recirculation line and wherein a first branch line branches from the first recirculation line and opens into the second heat exchanger and a second branch line connects the second heat exchanger to the inlet of the condensate preheater.

3. The power plant as claimed in claim 2, wherein the first branch line branches from the first recirculation line downstream of the recirculation pumps in the flow direction.

4. The power plant as claimed in claim 2, wherein the first high-load valve is arranged in the first branch line and the first low-load valve is arranged in a first bypass line around the first high-load valve.

5. The power plant as claimed in claim 2, wherein the first high-load valve is arranged in the second branch line and the first lowload valve is arranged in a first bypass line around the first high-load valve.

6. The power plant as claimed in claim 5, wherein a second recirculation line branches from the second branch line and opens into the first recirculation line upstream of the redundant recirculation pumps in the flow direction of a condensate.

7. The power plant as claimed in claim 5, wherein a second recirculation line branches from the first bypass line and opens into the first recirculation line upstream of the redundant recirculation pumps in the flow direction of a condensate.

8. The power plant as claimed in claim 2, wherein a third recirculation line leads from the second branch line into the first branch line and a pump is connected into the third recirculation line.

9. The power plant as claimed in claim 2, wherein the condensate preheater has at least two heating surfaces of which at least one has a bypass.

10. The power plant as claimed in claim 1, wherein the second high-load valve is arranged in the intermediate circuit and the second low-load valve is arranged in a second bypass line around the second high-load valve, wherein a third bypass line around the second heat exchanger, followed by a static mixer, is also arranged in the intermediate circuit, wherein the second high-load valve fulfills a function of a three-way valve and an outlet of the second high-load valve is connected to an inlet of the second heat exchanger and the third bypass line branches from a further outlet of the second high-load valve.

11. The power plant as claimed in claim 1, further comprising:
a device for controlling the first and second high-load valves and first and second low-load valves.

12. The power plant as claimed in claim 1, wherein the second heat exchanger is at least one fully-welded plate heat exchanger.

13. A method for efficiency optimization and operating range extension of a power plant, the power plant comprising a gas turbine and a heat recovery steam generator, the method comprising:
conducting a fluid in an intermediate circuit and in the process heat is transferred via a first heat exchanger to air which is inducted by the gas turbine,
transferring heat of a preheated condensate from the heat recovery steam generator via a second heat exchanger to the fluid,
wherein, depending on heat demand,
directing the condensate via a first high-load valve or via a first low-load valve which is connected in parallel to the first high-load valve and designed for smaller throughflows than the first high-load valve
wherein, depending on heat demand, the fluid is directed via a second high-load valve or via a second low-load valve which is connected in parallel to the second high-load valve and designed for smaller throughflows than the second high-load valve.

14. The method as claimed in claim 13, wherein at least some of the condensate, after yielding heat to the fluid, bypassing a preheating, is admixed with a flow of preheated condensate and the mixture is fed to the second heat exchanger.

15. The method as claimed in claim 13, further comprising: using a heating margin of the intermediate circuit as a control variable for a condensate mass flow through the second heat exchanger.

16. The method as claimed in claim 13, further comprising: using a valve position of the second high-load valve as a control variable for a condensate mass flow through the second heat exchanger.

17. The method as claimed in claim 13, further comprising:
continuously adjusting a temperature setpoint value for intake air in dependence of a gas turbine proportion of an established power setpoint value of the power plant.

18. The method as claimed in claim 13, further comprising:
banking up a low-pressure stage in the heat recovery steam generator in order to shift heat in the heat recovery steam generator to the condensate preheater.

19. The method as claimed in claim 13, further comprising:
opening a high-pressure preheater bypass in the heat recovery steam generator in order to shift heat to the condensate preheater.

20. The method as claimed in claim 13, further comprising:
partially shutting down burners of the gas turbine.

* * * * *